US011171949B2

(12) United States Patent
Ramzan et al.

(10) Patent No.: US 11,171,949 B2
(45) Date of Patent: Nov. 9, 2021

(54) GENERATING AUTHENTICATION INFORMATION UTILIZING LINEAR FEEDBACK SHIFT REGISTERS

(71) Applicant: EMC IP Holding Company LLC, Hopkinton, MA (US)

(72) Inventors: Zulfikar A. Ramzan, Saratoga, CA (US); Piers Bowness, Boxboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 332 days.

(21) Appl. No.: 16/243,747

(22) Filed: Jan. 9, 2019

(65) Prior Publication Data

US 2020/0220866 A1   Jul. 9, 2020

(51) Int. Cl.
   *H04L 29/06* (2006.01)
(52) U.S. Cl.
   CPC ...... *H04L 63/0853* (2013.01); *H04L 63/0838* (2013.01)
(58) Field of Classification Search
   CPC ............... H04L 63/0853; H04L 63/0838
   USPC ............................................. 726/6
   See application file for complete search history.

(56) References Cited

U.S. PATENT DOCUMENTS

| 4,720,860 A | 1/1988 | Weiss |
| 5,168,520 A | 12/1992 | Weiss |
| 5,363,448 A * | 11/1994 | Koopman, Jr. ......... G06F 7/584 340/5.26 |
| 5,361,062 A | 12/1994 | Weiss et al. |
| 5,428,349 A | 6/1995 | Baker |
| 5,870,471 A | 2/1999 | Wootton et al. |
| 7,171,564 B2 * | 1/2007 | Kelley ................... G06F 21/34 713/183 |
| 7,409,705 B2 | 8/2008 | Ueda et al. |

(Continued)

FOREIGN PATENT DOCUMENTS

| EP | 1465057 A2 | 3/2004 |
| EP | 2026494 A1 | 2/2009 |

(Continued)

OTHER PUBLICATIONS

J.-C. Liou et al., "On Improving Feasibility and Security Measures of Online Authentication," International Journal of Advanced Computer Science and Technology (IJACST), 2010, pp. 6-16, vol. 2, No. 4.

(Continued)

*Primary Examiner* — Bryan F Wright
(74) *Attorney, Agent, or Firm* — Ryan, Mason & Lewis, LLP

(57) ABSTRACT

An apparatus includes at least one linear feedback shift register and at least one processing device comprising a processor coupled to a memory. The at least one processing device is configured to obtain a given value from the at least one linear feedback shift register, the given value comprising a set of bits representing a current state of the linear feedback shift register. The at least one processing device is also configured to generate authentication information by applying the given value obtained from the at least one linear feedback shift register as input to a pseudorandom function, and to provide the generated authentication information to a validating application.

20 Claims, 10 Drawing Sheets

(56) References Cited

U.S. PATENT DOCUMENTS

| | | |
|---|---|---|
| 8,224,887 B2 | 7/2012 | Singerle, Jr. |
| 8,245,292 B2 | 8/2012 | Buer |
| 8,504,842 B1 | 8/2013 | Meacham |
| 8,572,713 B2 | 10/2013 | Buer |
| 8,752,146 B1 | 6/2014 | van Dijk et al. |
| 8,752,153 B2 | 6/2014 | Vysogorets et al. |
| 8,861,249 B2* | 10/2014 | Chung .................. G11C 19/28 365/96 |
| 8,959,195 B1 | 2/2015 | Niranjan et al. |
| 9,147,063 B1 | 9/2015 | Florissi et al. |
| 9,191,386 B1 | 11/2015 | Yaron et al. |
| 9,225,717 B1 | 12/2015 | Brainard et al. |
| 9,411,948 B1 | 8/2016 | Suresh et al. |
| 2003/0204541 A1 | 10/2003 | Shackleford et al. |
| 2003/0204726 A1 | 10/2003 | Kefford et al. |
| 2007/0061589 A1 | 3/2007 | Ulmer et al. |
| 2007/0088952 A1 | 4/2007 | Hewitt et al. |
| 2007/0180504 A1 | 8/2007 | Hung |
| 2007/0186105 A1 | 8/2007 | Bailey et al. |
| 2008/0009345 A1 | 1/2008 | Bailey et al. |
| 2008/0144819 A1* | 6/2008 | Gehrmann ............ H04L 9/0643 380/46 |
| 2008/0148057 A1 | 6/2008 | Hauw |
| 2009/0187759 A1* | 7/2009 | Marsico .............. H04L 63/0846 713/155 |
| 2009/0222667 A1* | 9/2009 | Vauclair ................ H04L 9/0637 713/175 |
| 2009/0282247 A1 | 11/2009 | Kirkup et al. |
| 2009/0289916 A1 | 11/2009 | Dai |
| 2010/0031200 A1 | 2/2010 | Chen |
| 2010/0150348 A1 | 6/2010 | Fairbanks et al. |
| 2010/0242104 A1 | 9/2010 | Wankmueller et al. |
| 2011/0119746 A1 | 5/2011 | Yang |
| 2013/0014248 A1 | 1/2013 | McLaughlin et al. |

FOREIGN PATENT DOCUMENTS

| | | |
|---|---|---|
| GB | 2433147 A | 6/2007 |
| WO | 2011124275 A1 | 10/2011 |
| WO | 2012001428 A1 | 1/2012 |

OTHER PUBLICATIONS

A.J. Menezes et al., "Handbook of Applied Cryptography," CRC Press, Oct. 1996, 794 pages.

P. Mell et al., "The NIST Definition of Cloud Computing," U.S. Department of Commerce, Computer Security Division, National Institute of Standards and Technology, Special Publication 800-145, Sep. 2011, 7 pages.

IBM Technical Disclosure Bulletin, "Remote Terminal Computer Communication Security," TSB-ACC-No. NN73122312, Dec. 1, 1973, pp. 2312-2314, vol. 16, No. 7.

The Security Division of EMC, "RSA SecurID 800 Authenticator—Hybrid Authenticator that Provides a Seamless User Experience Across Multiple Applications Using Multiple Credentials," Jan. 9, 2019, 2 pages.

H. Jaiswal et al., "Generating a Novel Sequence of Random Variables Using a Power Optimized LFSR," Bhilai Institute of Technology, Durg, Chhattisgarh Swami Vivekan and Technical University, Jun. 2016, 48 pages.

M. Sahithi et al., "Implementation of Random Number Generator Using LFSR for High Secured Multi Purpose Applications," International Journal of Computer Science and Information Technologies (IJCSIT), 2012, pp. 3287-3290, vol. 3, No. 1.

A. Ajane et al., "Comparison of Binary and LFSR Counters and Efficient LFSR Decoding Algorithm," IEEE 54th International Midwest Symposium on Circuits and Systems (MWSCAS), Aug. 7-10, 2011, 4 pages.

Maxim Integrated Products, Inc., "Pseudo Random Number Generation Using Linear Feedback Shift Registers," https://www.maximintegrated.com/en/app-notes/index.mvp/id/4400, Jun. 30, 2010, 5 pages.

\* cited by examiner

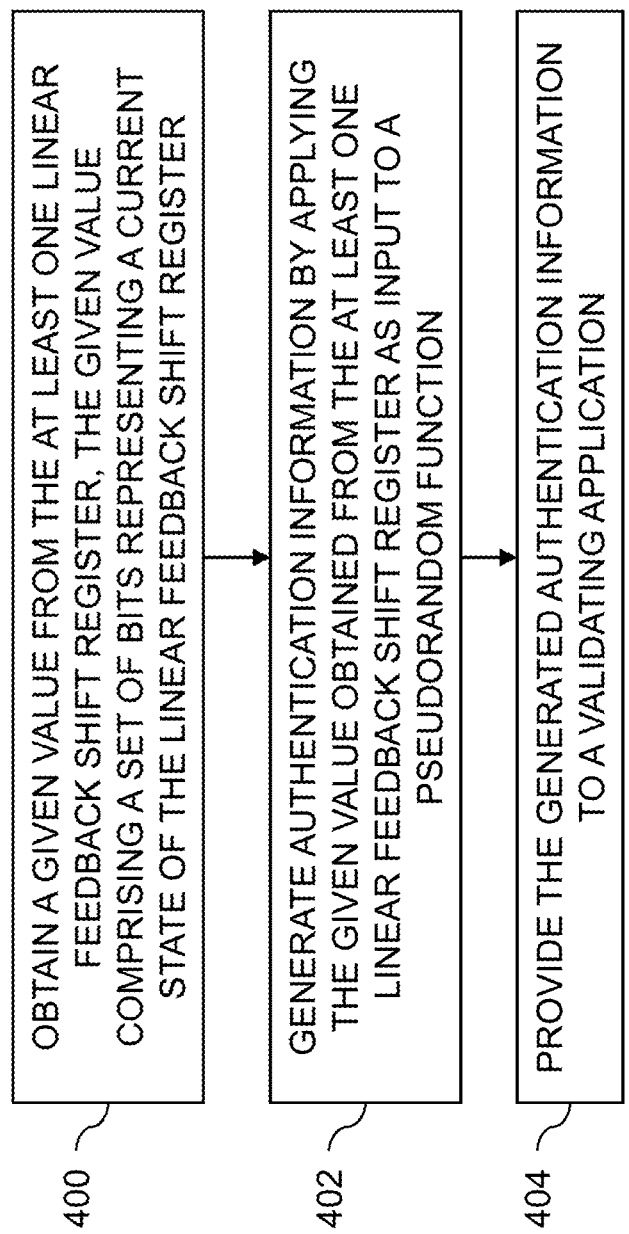

| Iteration # | $X_0$ (Has Tap) | $X_1$ (Has Tap) | $X_2$ (No Tap) | $X_3$ (No Tap) | $X_0 \oplus X_1$ |
|---|---|---|---|---|---|
| 0 | 0 | 0 | 0 | 1 | $0 \oplus 0 = 0$ |
| 1 | 0 | 0 | 1 | 0 | $0 \oplus 0 = 0$ |
| 2 | 0 | 1 | 0 | 0 | $0 \oplus 1 = 1$ |
| 3 | 1 | 0 | 0 | 1 | $1 \oplus 0 = 1$ |
| 4 | 0 | 0 | 1 | 1 | $0 \oplus 0 = 0$ |
| 5 | 0 | 1 | 0 | 0 | $0 \oplus 1 = 1$ |
| 6 | 1 | 1 | 1 | 1 | $1 \oplus 1 = 0$ |
| 7 | 1 | 0 | 0 | 0 | $1 \oplus 0 = 1$ |
| 8 | 0 | 1 | 1 | 1 | $0 \oplus 1 = 1$ |
| 9 | 1 | 0 | 1 | 1 | $1 \oplus 0 = 1$ |
| 10 | 0 | 1 | 1 | 1 | $0 \oplus 1 = 1$ |
| 11 | 1 | 1 | 1 | 0 | $1 \oplus 1 = 0$ |
| 12 | 1 | 1 | 0 | 0 | $1 \oplus 1 = 0$ |
| 13 | 1 | 0 | 0 | 0 | $1 \oplus 0 = 1$ |
| 14 | 1 | 0 | 0 | 1 | $1 \oplus 0 = 1$ |
| 15 | 0 | 0 | 0 | 1 | $0 \oplus 0 = 0$ |

FIG. 5B

GENERATING AUTHENTICATION INFORMATION UTILIZING LINEAR FEEDBACK SHIFT REGISTERS

FIELD

The field relates generally to information security, and more particularly to authentication.

BACKGROUND

Authentication techniques used today, such as multi-factor authentication techniques, may use various factors for authentication. These factors may include something-you-know such as a password, something-you-have such as a smart card or token, and something-you-are such as a fingerprint or other biometric. Authentication tokens may be used to generate the something-you-have factor, such as by periodically generating one-time passcodes. A user will provide the current one-time passcode displayed on the authentication token to a validating application. In so doing, the user effectively proves that they have possession of the authentication token. When authentication tokens are used to generate the something-you-have factor in addition to one or more other authentication factors, such as a traditional password or other something-you-know factor, security is improved since it is far less likely for a malicious actor to obtain both the user's password and access to the authentication token.

SUMMARY

Illustrative embodiments of the present invention provide techniques for generating authentication information utilizing linear feedback shift registers. Embodiments advantageously provide hardware savings in authentication tokens or other devices that generate one-time passcodes, as well as reducing power requirements for such authentication tokens or other devices.

In one embodiment, an apparatus comprises at least one linear feedback shift register and at least one processing device comprising a processor coupled to a memory. The at least one processing device is configured to obtain a given value from the at least one linear feedback shift register, the given value comprising a set of bits representing a current state of the linear feedback shift register. The at least one processing device is also configured to generate authentication information by applying the given value obtained from the at least one linear feedback shift register as input to a pseudorandom function, and to provide the generated authentication information to a validating application.

These and other illustrative embodiments include, without limitation, methods, apparatus, networks, systems and computer program products comprising processor-readable storage media.

BRIEF DESCRIPTION OF THE DRAWINGS

FIG. 4 is a flow diagram of an exemplary process for generating one-time passcodes utilizing linear feedback shift registers in an illustrative embodiment.

FIG. 5B shows a table illustrating a sequence of states of the linear feedback shift register of FIG. 5A in an illustrative embodiment.

DETAILED DESCRIPTION

Figure 1:
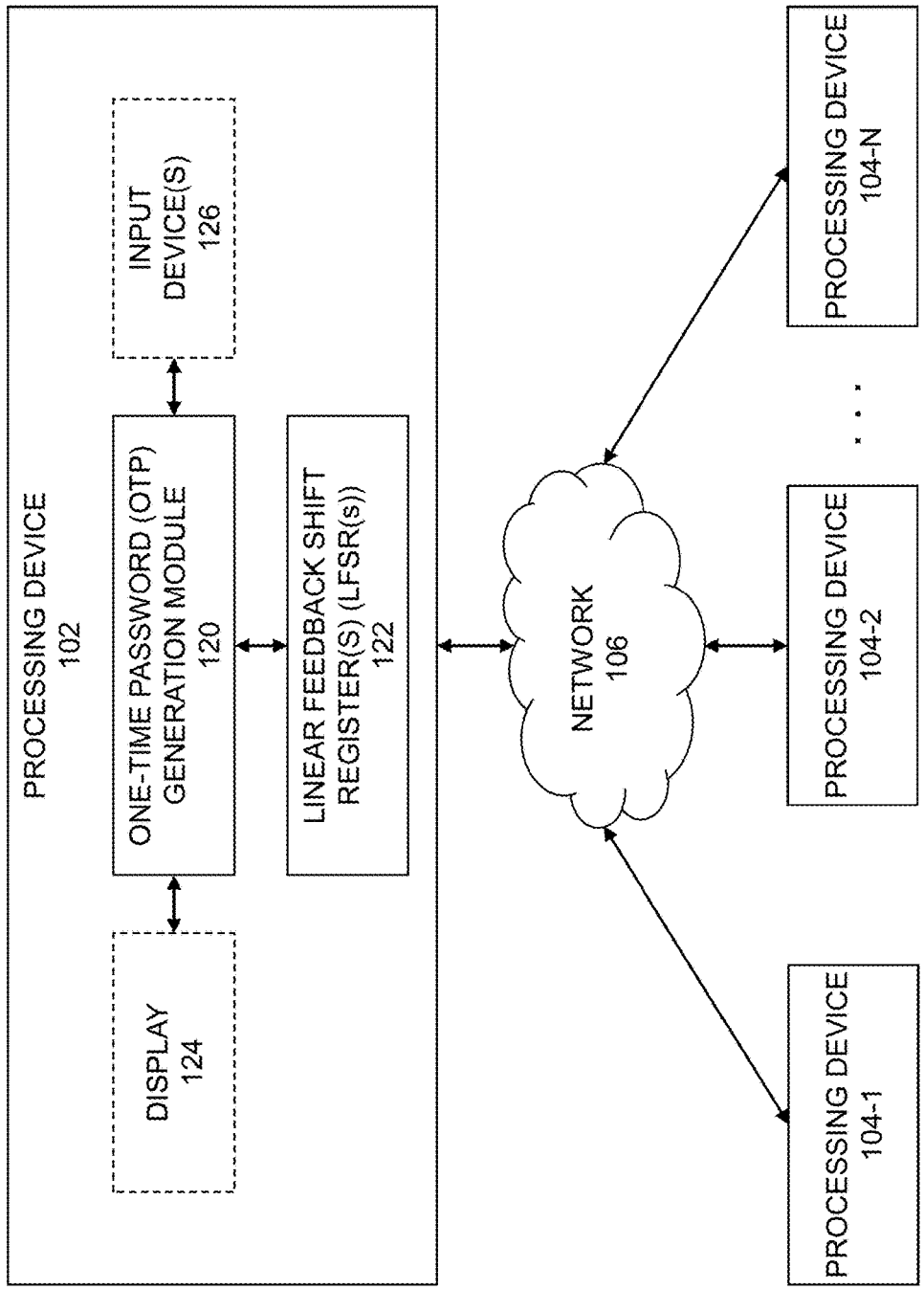
FIG. 1 is a block diagram of an information processing system for generating one-time passcodes utilizing linear feedback shift registers in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

The term "passcode" as used herein is intended to include authentication information such as OTPs, or more generally any other information that may be utilized for cryptographic authentication purposes. Such passcodes may therefore include numerical tokencodes, alphanumeric passwords, passphrases, etc. Although the illustrative embodiments will be described below primarily in the context of one-time passcodes (OTPs), it is to be appreciated that the invention is more broadly applicable to any other type of passcode.

OTPs are typically generated by applying a proposed pseudorandom function (PRF) to a counter value, with the output of the PRF being used as the OTP. With each iteration, the counter value is incremented to ensure that the input to the PRF is unique, and hence the output sequence generated by the PRF remains unpredictable. In custom hardware, counters are relatively expensive to implement. For example, a counter may require two exclusive-or (XOR) gates, a first XOR gate that adds the bits in question and a second XOR gate that incorporates the carry bit from the previous addition of bits. Moreover, to ensure arithmetic consistency, a delay needs to be introduced between operations so that the carry bit has time to propagate.

Illustrative embodiments provide techniques for supplanting traditional counters in OTP implementations with an alternate mechanism that offers a significant savings in the hardware required. A goal is to produce a sufficiently long sequence of values that is non-repeating. These distinct values can then be fed into a PRF to produce unpredictable output values. Illustrative embodiments meet this goal by generating the long, non-repeating sequence of values using linear feedback shift registers (LFSRs). In some embodiments, the LFSRs have a characteristic polynomial that is primitive in the Galois Field GF($2^n$), where n is the input length to the PRF. Advantageously, the use of LFSRs provides significant hardware savings. For example, a unique sequence of values of every number between 1 and 4,294,967,295 (e.g., a 32-bit "counter") can be generated using a LFSR with only 3 XOR operations and a left shift. In contrast, a conventional incrementing 32-bit counter requires 64 XOR operations and 63 "delays" to allow the carry bit to propagate. By significantly reducing the hardware required to implement OTPs, the cost of producing authentication tokens drops significantly. Further, such authentication tokens consume significantly less power.

As used herein, the term "authentication token" refers to a device that is configured to produce authentication information such as OTPs (e.g., as a something-you-have factor for authentication). An authentication token may be a hardware authentication token or a software authentication token (e.g., an authentication token that runs as an application on another device). It should be noted that a given authentication token need not take the form of a stand-alone hardware token, though various embodiments are described below with respect to such stand-alone hardware tokens. In some cases, the authentication token may be incorporated into another processing device, such as a computer, a smartphone, tablet, laptop or other mobile computing device, etc.

Authentication tokens include both time-synchronous and event-synchronous tokens. In a typical time-synchronous token, the displayed OTPs are based on a secret value and the time of day. A verifier with access to the secret value and a time of day clock can verify that a given presented OTP is valid.

One particular example of a time-synchronous authentication token is the RSA SecurID® user authentication token, commercially available from RSA, a part of Dell EMC.

Event-synchronous tokens generate OTPs in response to a designated event, such as a user pressing a button on the token. Each time the button is pressed, a new OTP is generated based on a secret value and an event counter. A verifier with access to the secret value and the current event count can verify that a given presented passcode is valid.

Other types of authentication tokens include hybrid time-synchronous and event-synchronous tokens.

As noted above, hardware authentication tokens may be used to generate OTPs, or more generally something-you-have authentication information. While hardware authentication tokens have numerous benefits (e.g., physical resilience, less susceptible to sniffing via malware, etc.), hardware authentication tokens can be relatively expensive to construct. Generally speaking, any mechanism that can decrease the complexity of how hardware authentication tokens work confers numerous benefits. Such benefits include decreasing the cost of building the token, particularly where the hardware authentication token is custom built rather than leveraging an off the shelf processing component. Less complex hardware means that fewer logic gates are needed for implementation, translating directly to reduced costs.

Another benefit is that decreasing the complexity of how the hardware authentication token works makes it easier to implement additional security countermeasures in the hardware authentication token. Hardware authentication tokens may use additional security countermeasures to address information leakage. For example, sometimes measuring how much power a device consumes can provide insight into the data being computed (e.g., when more bits are set to 1, more power is consumed), which can in turn leak information about any cryptographic keys or other data used on the device. Such attacks are referred to as side-channel attacks. Embedded devices can leak information through side channels, revealing, for example, how much power the device consumes. Side channel information can then be used to ascertain important information about the operation and state of the device, possibly revealing information about sensitive data like seeds and keys. It should be noted that such side-channel attacks are not merely theoretical, but can cause real-world issues. There are techniques for addressing such side-channel attacks, including developing additional tamper resistance components. Such techniques include, but are not limited to, the incorporation of noise or other forms of randomness into the underlying computations, obfuscation of how computations are performed, physical mechanisms that stem what information can be gleaned from the device, etc. Lowering hardware complexity of a hardware authentication token can simplify countermeasures for such attacks.

Still further benefits are provided in the ease of incorporating additional functionality in the hardware authentication token. In addition to generating OTPs, it may be desirable for a hardware authentication token to have other functionality such as the ability to have user-configured seed values, adding biometric security measures, etc. By simplifying the basic hardware footprint of the authentication token, there is potentially more room to incorporate other functionality without ballooning costs or having a large physical form factor.

Accordingly, there is a need for methods, components and systems that reduce the complexity of authentication tokens. Illustrative embodiments meet these and other needs, by using a LFSR rather than a traditional counter inside an authentication token. Embodiments provide significant savings of hardware and complexity. As noted above, a 32-bit counter requires 3 XOR operations and 63 delay elements. In contrast, LFSR-based approaches described herein may require only 3 XOR operations and a single delay.

FIG. 1 shows an information processing system 100 configured in accordance with an illustrative embodiment. The information processing system 100 is assumed to be built on at least one processing platform and provides functionality for generating authentication information using LFSRs. The system 100 includes processing device 102 and processing devices 104-1, 104-2, . . . 104-N (collectively, processing devices 104) connected over network 106.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks. The network 106 may also or alternatively include one or more short range wireless networks, such as Bluetooth or Near Field Communication (NFC) networks.

The processing device 102 comprises an OTP generation module 120 and one or more LFSRs 122. The OTP generation module 120 is configured to utilize LFSRs 122 to provide "counter" type functionality for obtaining a unique sequence of values (e.g., a non-repeating sequence of values up to some desired threshold). These unique values from the LFSRs 122 are used by the OTP generation module 120 as input to a PRF to output OTPs or other authentication information. As will be described in further detail below, the PRF may also take as input additional information, such as a seed value, a key, etc.

The processing device 102 may further comprise a display 124 and one or more input devices 126. In FIG. 1, the display 124 and input devices 126 are shown in dashed outline, as they are optional components of the processing device 102.

OTPs or other authentication information generated by the OTP generation module 120 may be output or presented on the display 124. A user of the processing device 102 may then transcribe such OTPs or other authentication information into a validating application (e.g., at one or more of the processing devices 104).

In some embodiments, the OTP generation module 120 generates OTPs based not only values obtained from the LFSRs 122, but also on additional information or input. Such additional input may be provided by a user via input devices 126, which may be a keyboard, mouse, or set of buttons or other input mechanisms which allow the user to "type" or otherwise provide such additional input. In some cases, the display 124 is a touchscreen display, and thus the display 124 and input devices 126 may be combined. The input devices 126 may also or alternatively include one or more biometric readers, such as a fingerprint sensor, a retina scanner, a camera for facial recognition, a microphone for voice input, etc.

The term "processing device" as used herein is intended to be construed broadly, so as to encompass a wide variety of devices. Processing devices include, by way of example, authentication tokens, smartcards, radio frequency identification (RFID) tags and other lightweight devices. Processing devices also include computing devices, including desktop computing devices and mobile computing devices such as smartphones or other cell phones, tablets, laptops, etc.

In the system 100, the processing device 102 is an example of an authenticating device and the processing devices 104 are examples of verifying devices. The processing device 102 provides OTPs or other authentication information generated by the OTP generation module 120 over network 106 to one or more of the processing devices 104, which utilize the received OTPs or other authentication information to authenticate the processing device 102. It should be appreciated that the OTP generation module 120 may be configured to generate different sets of OTPs for different ones of the processing devices 104, or for different validating applications running on a given one of the processing devices 104 (e.g., using different PRFs with different unique sequences of values provided from different ones of the LFSRs, using different keys, seeds or other information, etc.)

At least portions of the OTP generation module 120 and LFSRs 122 may be implemented at least in part in the form of software that is stored in memory and executed by a processor.

Although not explicitly shown in FIG. 1, one or more input-output devices such as keyboards, displays or other types of input-output devices may be used to support one or more user interfaces to the processing devices 104, as well as to support communication between the processing devices 102 and 104 and other related systems and devices not explicitly shown.

It is to be appreciated that the particular set of elements shown in FIG. 1 in system 100 is presented by way of example, and in other embodiments additional or alternative elements may be used. Thus, another embodiment may include additional networks, devices, servers, etc. For example, a system may include multiple additional processing devices that communicate with one another via one or more networks, etc.

One or both of the processing devices 102 and 104 of system 100 may in some embodiments be part of cloud infrastructure such as an Amazon Web Services (AWS) system. Other examples of cloud-based systems that can be used to provide the processing devices 102 and 104 include Virtustream Enterprise Cloud Virtustream Storage Cloud, Google Cloud Platform (GCP) and Microsoft Azure.

The processing devices 102 and 104 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The processing devices 102 and 104 may be implemented on respective distinct processing platforms, although numerous other arrangements are possible. For example, in some embodiments at least portions of the processing devices 102 and 104 are implemented on the same processing platform. The processing device 102 can therefore be implemented at least in part within at least one processing platform that implements at least a portion of one or more of the processing devices 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the processing devices 102 and 104, or portions or components thereof, to reside in different data centers. Numerous other distributed implementations are possible.

Additional examples of processing platforms utilized to implement the system 100 in illustrative embodiments will be described in more detail below in conjunction with FIGS. 7 and 8.

It is to be appreciated that these and other features of illustrative embodiments are presented by way of example only, and should not be construed as limiting in any way.

Figure 2:
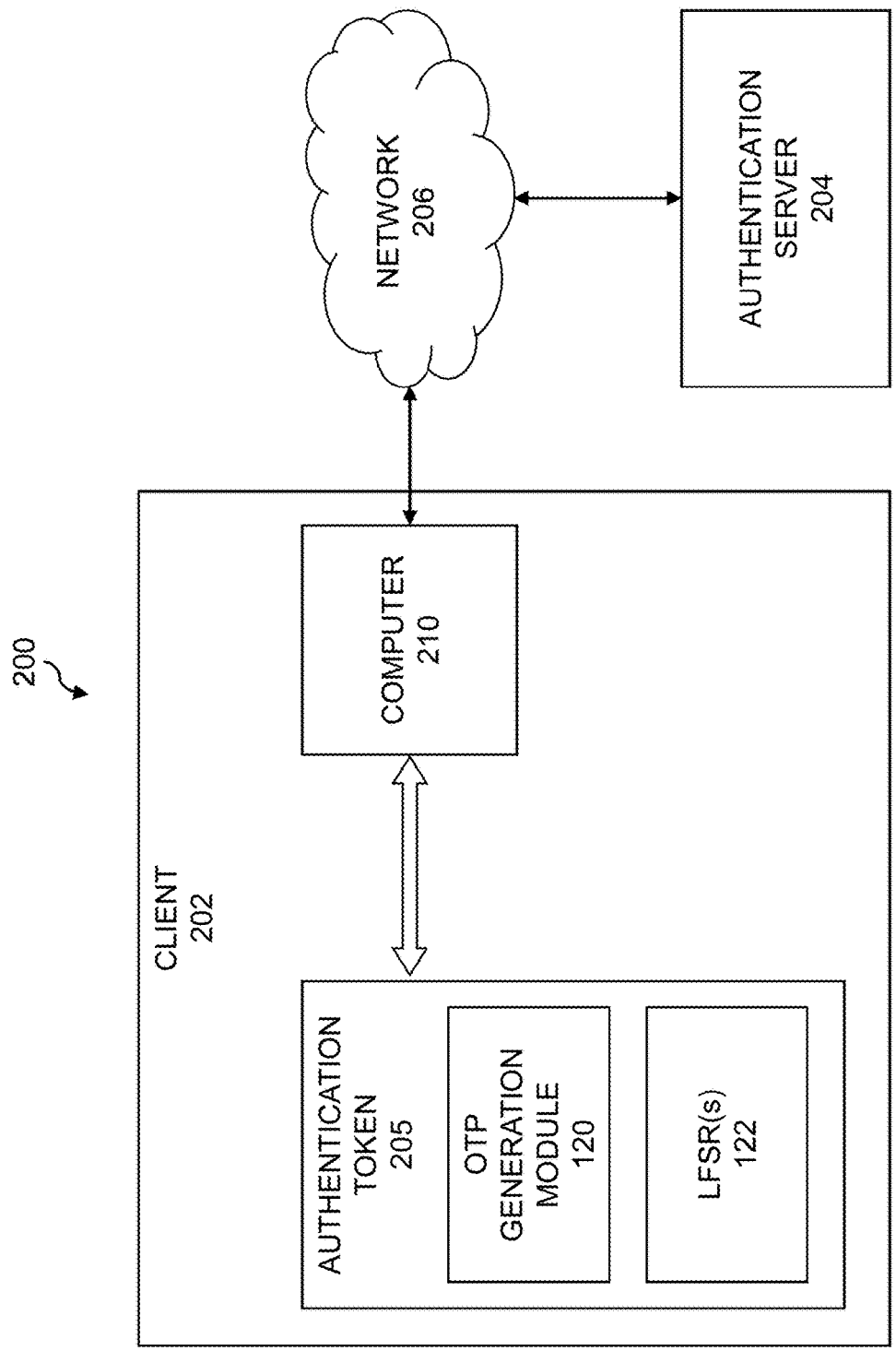
FIG. 2 shows a possible implementation of the FIG. 1 system including an authentication token and an authentication server in an illustrative embodiment.

FIG. 2 shows an example of an information processing system 200 corresponding generally to an implementation of the information processing system 100. In the information processing system 200, a client 202 and authentication server 204 communicate over a network 206. The term "authentication server" should be understood to encompass any type of processing device or set of such devices that is operative to authenticate an OTP or other authentication information provided by another processing device. An authentication server need not be a network-based server, and may be implemented as a portion of a device that performs other functions, as a combination of multiple servers or other devices, or in other forms.

The client 202 comprises an authentication token 205 and computer 210. The authentication token 205, which implements OTP generation module 120 and LFSRs 122, is an example of the processing device 102. The authentication server 204 is an example of one or more of the processing devices 104.

The authentication token 205 communicates with the authentication server 204 via a host device such as computer 210. For example, the authentication token 205 may provide authentication data such as an OTP to the authentication server 204 by first transmitting such authentication data to the computer 210, which then sends such authentication data to the authentication server 204 over network 206.

In some embodiments, the authentication token 205 and computer 210 may be connected via a wired interface such as a universal serial bus (USB) interface, or may connect wirelessly via a Bluetooth connection, an IEEE 802.11 connection, an NFC interface, etc.

The computer 210 may be a desktop or portable personal computer, mobile telephone, personal digital assistant (PDA), wireless email device, workstation, kiosk, television set-top box, game console, or any other processing device that provides an interface between authentication token 205 and authentication server 204. Authentication information such as OTPs generated by the authentication token 205 may be transmitted to the authentication server 204 via the computer 210.

The authentication token 205 may be a hardware authentication token or a software authentication token. In some embodiments, the authentication token 205 may comprise an RSA SecurID® user authentication token, suitably modified as disclosed herein. It should also be noted that a given authentication token need not take the form of a stand-alone hardware token. For example, such a device may be incorporated into another processing device, such as a computer, mobile telephone, etc. In one such implementation, the computer 210 and authentication token 205 may be combined into a single processing device that communicates with the authentication server 204 over network 206.

Authentication information can be communicated directly from the authentication token 205 to the computer 210, instead of being displayed to a user via a display of the authentication token 205. For example, a wired connection such as a USB interface may be used for this purpose. Wireless authentication tokens are also known. In authentication tokens of this type, the OTPs or other authentication information are wirelessly communicated to the computer 210 or another element of the information processing system 200 such as authentication server 204. These wired or wireless arrangements, also referred to herein as connected tokens, save the user the trouble of reading the passcode from the display and manually entering it into the computer 210.

The authentication token 205 may be programmed with a random seed or other type of key that is stored in a token record file. The record file is also loaded into the authentication server 204, such that the authentication server 204 can create matching OTPs or other authentication information for the authentication token 205 based on the key and a current time or event count (e.g., implemented via the LFSRs 122 as described herein). It should be noted that the authentication token 205 may include multiple token record files, with distinct seeds or keys and time or event counts for use in generating OTPs or other authentication information for different authentication servers or more generally different validating applications that may be on a same authentication server.

In order to protect authentication tokens such as authentication token 205 against cloning attacks, the keys used may be periodically refreshed using an approach known as drifting keys, in which a set of secret keys shared between authentication token 205 and authentication server 204 evolve randomly over time. Periodic refresh operations are applied to the set of keys, typically at the start of respective time periods.

In the system 200, the authentication token 205 may be used by the computer 210 to authenticate a user of the computer 210 to the authentication server 204. In an authentication session, the authentication token 205 via OTP generation module 120 and LFSRs 122 generates a passcode or other authentication information that is transmitted to the computer 210. The passcode or other authentication information is then transmitted from the computer 210 to the authentication server 204 via network 206. The authentication server 204 uses the transmitted passcode or other authentication information to determine the authenticity of the authentication token 205, and thus the computer 210.

Figure 3:
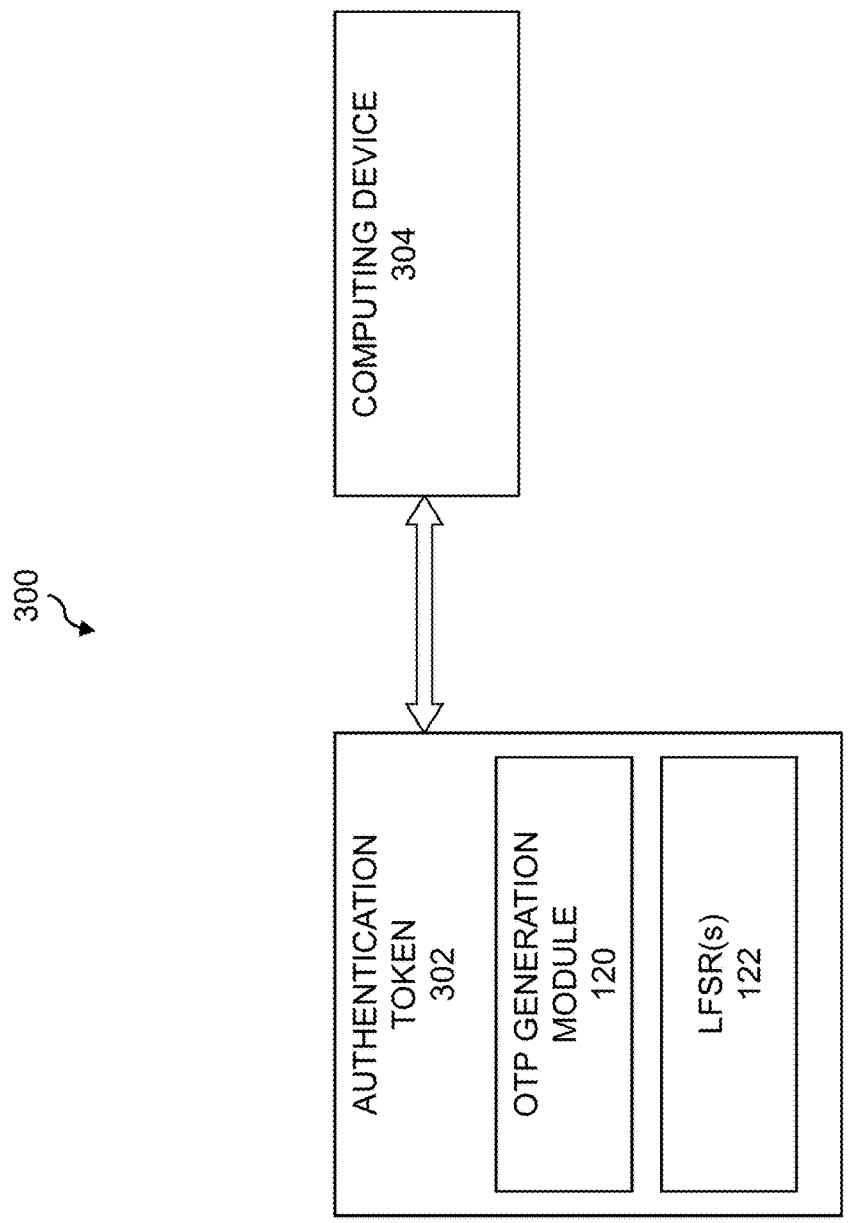
FIG. 3 shows another possible implementation of the FIG. 1 system including an authentication token and a computing device in an illustrative embodiment.

FIG. 3 illustrates another example of an information processing system 300 corresponding generally to an implementation of information processing system 100. In the system 300, an authentication token 302 communicates with computing device 304. The authentication token 302 is an example of the processing device 102, and the computing device 304 is an example of one of the processing devices 104. The authentication token 302 implements OTP generation module 120 and LFSRs 122.

In the system 300, the authentication token 302 via OTP generation module 120 and LFSRs 122 generates and transmits a passcode or other authentication information to the computing device 304 for authenticating to the computing device, rather than an external server as in system 200. The computing device 304 utilizes the transmitted passcode or other authentication information to determine the authenticity of the authentication token 302.

Although not explicitly shown in FIGS. 2 and 3, the authentication token 205, computer 210, server 204, authentication token 302, and computing device 304 may be implemented using one or more processing platforms, such as those described below with respect to FIGS. 7 and 8.

It is to be appreciated that the systems 200 and 300 may in some embodiments be combined. For example, an authentication token may be used for authenticating to a computer as well as a remote server, or may be used for authenticating to multiple distinct remote servers. The authentication token can store separate seed or key values for use in generating passcodes or other authentication information for each of the servers and/or computing devices to which it authenticates. The authentication token may also use different sets of LFSRs to generate unique sequences of values for generating passcodes or other authentication information for such different servers and computing devices.

An exemplary process for generating authentication information utilizing LFSRs will now be described in more detail with reference to the flow diagram of FIG. 4. It is to be understood that this particular process is only an example, and that additional or alternative processes for generating authentication information utilizing LFSRs can be carried out in other embodiments.

In this embodiment, the process includes steps 400 through 404. These steps are assumed to be performed by the processing device 102 utilizing the OTP generation module 120 and LFSRs 122. The process begins with step 400, obtaining a given value from at least one LFSR. The given value comprises a set of bits that represent a current state of the LFSR. In step 402, authentication information is generated by applying the given value obtained from the LFSR as input to a PRF. In step 404, the generated authentication information is provided to a validating application. In some embodiments, the generated authentication information comprises an OTP. In other embodiments, however, the generated authentication information may comprise a multiple-use password or passcode (e.g., a password or passcode that is valid for a designated period of time or until occurrence of some designated event, and is thus not necessarily limited to a single use), or other types of information that may be used to authenticate to a validating application. In some embodiments, the generated authentication information is used as one factor (e.g., a something-you-have factor) in a multi-factor authentication process with the validating application.

The FIG. 4 process may be performed by a hardware authentication token. In such cases, the validating application may run on an additional processing device that is distinct from the hardware authentication token. The FIG. 4 process may also be performed at least in part by a software authentication token. In such cases, the validating application may, but is not required to be, another application that runs on the same device that implements the software authentication token. It should be appreciated that in either case, the LFSR may be implemented using hardware, software, or combinations of hardware and software.

In some embodiments, the FIG. 4 process is preceded by a setup step where the LFSR is initialized with a starting state comprising at least one non-zero bit value. The LFSR, for example, may comprise an n-bit LFSR that is configured to produce a sequence of $2^n-1$ distinct states when initialized with the starting state comprising at least one non-zero bit value.

In some embodiments, the FIG. 4 process may include initiating a shift in the LFSR. The shift may be initiated before or after a request for the current state of the LFSR that is used as the given value input to the PRF. For example, the current state of the LFSR may be read out to obtain the given value followed by a shift operation, or the shift operation may be initiated followed by reading out the current state of the LFSR to obtain the given value. In some embodiments, the shift is initiated responsive to expiration of a designated time window (e.g., to implement a time-synchronous authentication token). For example, the LFSR may initiate a shift every 30 seconds, every minute, every hour, etc.

In other embodiments, the shift may be initiated responsive to detecting one or more designated events (e.g., to implement an event-synchronous authentication token). In some cases, the designated event is detected by receiving user-driven input to an authentication token (e.g., a user pressing a button or otherwise interfacing with an input component or device of the authentication token). In other cases, the designated event may be detected by receiving an indication that the event has occurred from one or more additional devices (e.g., one or more devices external to the authentication token). Combinations of the above are also possible to implement a hybrid time and event synchronous authentication token.

In some embodiments, step 400 comprises obtaining a first value comprising a first set of bits representing a current state of a first LFSR, obtaining at least a second value comprising a second set of bits representing a current state of at least a second LFSR, and combining the first value and the second value to generate the given value. Combining the first value and the second value to generate the current value may comprise concatenating the first value and the second value, interleaving bits from the first value and the second value, etc.

In other embodiments, step 400 comprises obtaining a first value comprising a first set of bits representing a current state of the LFSR, obtaining a second value comprising a second set of bits from at least one additional source, and combining the first value and the second value to generate the given value. Again, combining the first value and the second value may include concatenating the first value and the second value, interleaving bits from the first value and the second value, etc. The additional source may comprise at least one user input device. The user input device may be part of a hardware authentication token, or part of a processing device that implements a software authentication token. The user input device may comprise a keyboard, mouse, set of buttons, a biometric reader, a camera, etc.

It should further be appreciated that, in still other embodiments, step 400 may include obtaining a first value comprising a first set of bits representing a current state of a first LFSR, obtaining at least a second value comprising a second set of bits representing a current state of at least a second LFSR, obtaining a third value comprising a third set of bits from at least one additional source, and combining the first value, the second value, and the third value to generate the given value. Combining the first value, the second value and the third value to generate the given value may include concatenation of these values, interleaving of bits from these values, combinations thereof, etc.

In some embodiments, step 404 includes providing first authentication information generated by applying the given value obtained from the LFSR as input to the PRF, and providing second authentication information generated by applying one or more previous values obtained from the LFSR as input to the PRF, the one or more previous values comprising respective sets of bits representing one or more previous states of the LFSR. Such an approach may be used for enhanced security, to account for situations in which an authentication token performing the FIG. 4 process becomes out of sync with a device implementing the validating application, etc.

A LFSR provides a mechanism for taking a bit string and producing another bit string that is derived by shifting the bits. Various embodiments are described herein with respect to shifting bits to the "left" to therefore open a position to the right. It should be appreciated, however, that other conventions may be adopted such as shifting bits to the "right" to open up a position on the left. Other conventions may also be used. The bit that is opened up (e.g., a rightmost bit when shifting to the left) is replaced with an XOR of a fixed subset of the original bits. The subset of bit positions to which the XOR operation is applied is referred to as the taps of the LFSR. While various embodiments are described herein with respect to fixed tap positions, it should be appreciated that embodiments may also use tap positions that change over multiple iterations.

Figure 5A:
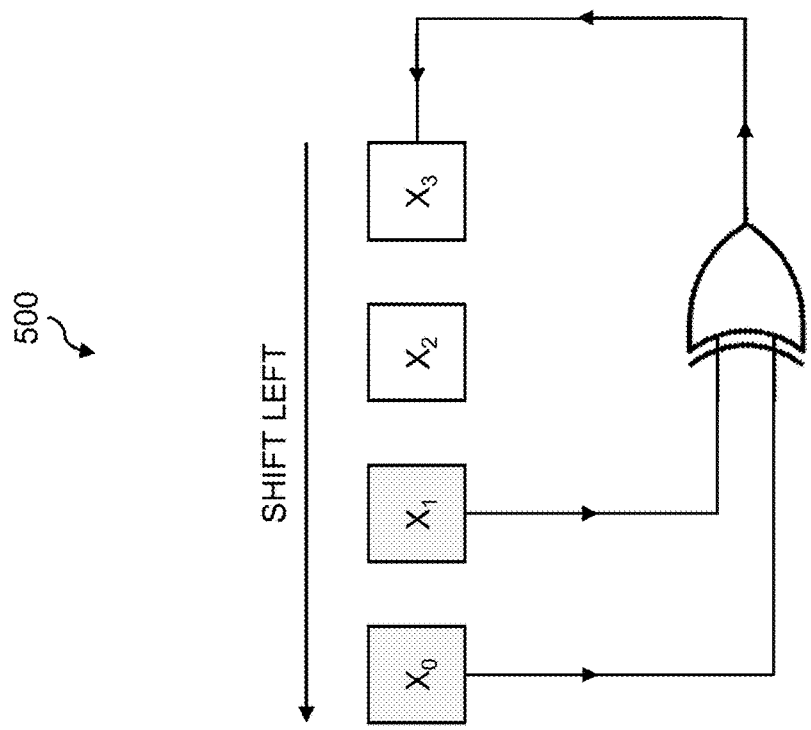
FIG. 5A shows a flow diagram of operation of a linear feedback shift register in an illustrative embodiment.

FIG. 5A shows an example of a 4-bit LFSR 500, in which taps are applied to the leftmost and second leftmost bits (denoted in FIG. 5 by the light gray shading thereof for positions $X_0$ and $X_1$). The XOR operation is applied to the values contained in $X_0$ and $X_1$, and the result is fed back into the LFSR 500. If the starting state is 0001 (e.g., where $X_0$ is 0, $X_1$ is 0, $X_2$ is 0, and $X_3$ is 1), then the sequence of states of the LFSR 500 is shown in the table 510 of FIG. 5B.

To start (e.g., in iteration 0), the initial state is 0001. The left and second leftmost bits ($X_0$ and $X_1$) are both 0. The XOR (e.g., $X_0 \oplus X_1$) is therefore also 0. In the next iteration, the state bits are shifted to the left by one bit. In other words, $X_0$ takes on the value of $X_1$ and becomes 0; $X_1$ takes on the value of $X_2$ and becomes 0 as well; and $X_2$ takes on the value of $X_3$ and becomes 1. $X_3$ is assigned the value produced by the XOR of the values specified in the taps, in this case $X_0 \oplus X_1$, which evaluates to 0. This procedure results in the next sequence of 0010, which becomes the new state of the LFSR 500 as indicated in the table 510 for iteration 1. This process is repeated again, and in the next iteration (e.g., iteration 2), the value 0100 is produced. Over the course of iterations 0 to 14, the LFSR 500 produces the following sequence of values: 0001, 0010, 0100, 1001, 0011, 0110, 1101, 1010, 0101, 1011, 0111, 1111, 1110, 1100, and 1000. The LFSR 500 thus produces 15 distinct values (in iteration 15, the sequence repeats and the value is 0001, the same as the starting state in iteration 0). This sequence of values represents every possible non-zero bit string of length 4. From a hardware perspective, achieving this result requires only a single XOR combined with a left shift in each iteration. This is in contrast with trying to generate all 15 non-zero binary strings of length 4 using a traditional incremental counter, which would have required seven XOR operations and 3 delays since the carry bit needs time to propagate and settle.

By carefully selecting which positions of the LFSR to use as taps, the LFSR may be configured to generate long non-repeating sequences. In particular, whenever the number of bits n is a power of 2, there is a set of LFSR taps that will result in generation of a maximal sequence of $2^n-1$ non-zero strings of length n. To identify when a given selection of taps leads to an LFSR that generates a maximal sequence, the reciprocal characteristic polynomial (also referred to as the feedback polynomial) of the LFSR is considered. The reciprocal characteristic polynomial is defined as $x^n+c_{n-1}x^{n-1}+\ldots+c_1x+1$, where $c_i$ is equal to 1 when the ith position (reading from left to right) is selected as a tap and is equal to 0 otherwise ($c_0$ is implicitly set to 1). Note that $x^n$ is included in the characteristic polynomial even though it does not technically represent a bit position because it is mathematically convenient to do so as described in further detail below. For the LFSR 500 of FIG. 5A, the characteristic polynomial is $x^4+x+1$ since the $x^n$ term is included (in this case n =4), and the taps are at the $0^{th}$ and $1^{st}$ positions.

If p(x) is a (monic degree n) primitive polynomial over $GF(2^n)$, then the LFSR with characteristics polynomial p(x) will generate a maximal sequence of $2^n-1$ distinct values when the initial state has at least one non-zero value. In the example above, the characteristic polynomial $x^4+x+1$, which is irreducible, is used for LFSR 500 and a maximal sequence of 15 (e.g., $2^4-1$) distinct values are generated. It should be noted that there are various irreducible polynomials that can be used as a feedback or characteristic polynomial for LFSRs.

PRFs are keyed mathematical functions whose output is indistinguishable from that of a truly random function, assuming that the underlying key is kept secret. PRFs are not actually random functions, but behave that way from the perspective of a resource-bounded adversary. In particular, if the inputs to a PRF are distinct, then the outputs will appear to be drawn from an identical and independent distribution. In other words, each output will be equally likely and information about a given output cannot be gleaned from information about a previous output. PRFs may be constructed using cryptographic hash functions, such as Secure Hash Algorithm (SHA)-256, or by leveraging block encryption algorithms such as Advanced Encryption Standard (AES).

Some algorithms for generating OTPs work by taking the output of a counter and applying a PRF to it. When a new password is needed, the counter is incremented and the PRF is applied to it again to get a new OTP. From a security perspective, because each counter value is distinct from the previous values, the output of the PRF is unpredictable and therefore can serve as an adequate OTP. One important observation is that, from a security perspective, what really matters is the distinctness of the inputs to the PRF. Counters provide one way to generate distinct inputs to a PRF. Illustrative embodiments leverage appropriately seeded LFSRs to generate distinct inputs to a PRF, rather than using a counter.

While the LFSR produces a seemingly haphazard sequence of distinct values, the LFSR is not relied upon to introduce any additional randomness or security. An LFSR-based approach on its own will not generate a pseudorandom sequence. It is the combination of the distinct inputs provided by the LFSR with the PRF that leads to the desired security. That said, LFSRs may be used in some case to generate pseudorandom sequences. For example, several LFSRs with different characteristic polynomials and seeds may be used simultaneously, with their outputs being combined to produce a pseudorandom sequence of values.

Figure 6A:
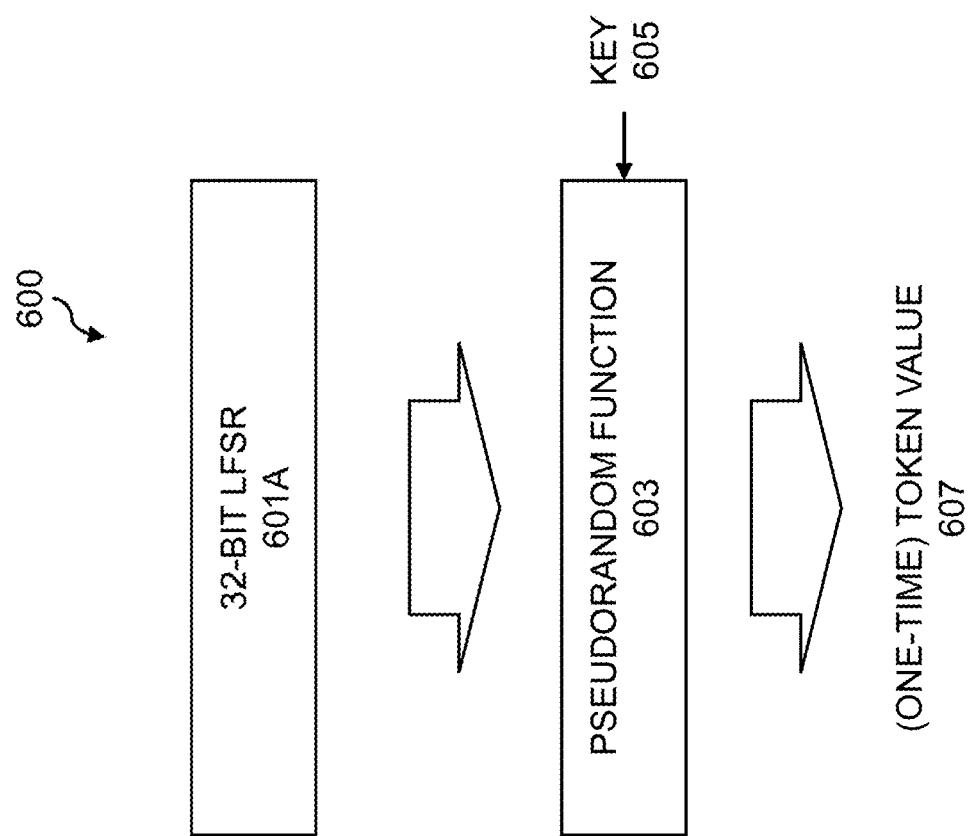
FIGS. 6A and 6B are flow diagrams illustrating generation of one-time token values in an illustrative embodiment.
Figure 6B:
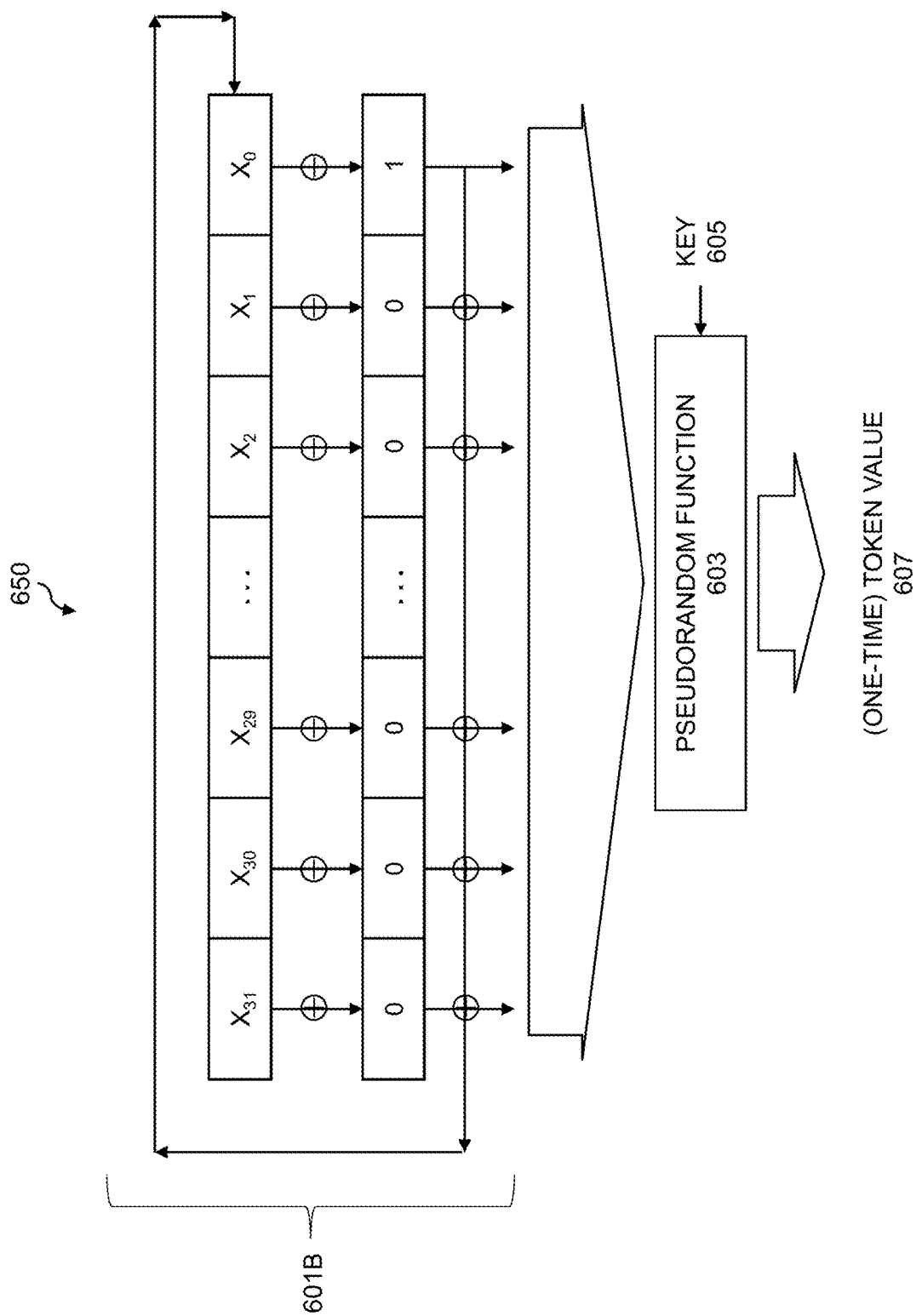

FIGS. 6A and 6B illustrates flows 600 and 650, respectively, for generating token values such as OTPs. The flow 600 shows generating of token values utilizing an LFSR, more particular a 32-bit LFSR 601A. The flow 650 shows generation of token values using a 32-bit counter 601B. It should be noted that while FIGS. 6A and 6B show generation of unique or distinct 32-bit values, in other embodiments different unique or distinct bit values may be generated using another LFSR (e.g., a 4-bit LFSR, an 8-bit LFSR, a 16-bit LFSR, etc.) or a combination of LFSRs as described elsewhere herein.

As illustrated in FIG. 6B, the 32-bit counter 601B uses 63 XOR operations, and further requires a delay element (not shown) between every bit position to ensure that the carry-bit has a chance to propagate and settle before being incorporated into the computation for the next set of bits. The 32-bit LFSR 601A provides various improvements relative to the 32-bit counter 601B. The 32-bit counter 601A is used to generate a unique sequence of bit values as described herein. The output of the 32-bit LFSR 601A or 32-bit counter 601B is input to a PRF 603. The PRF 603 is keyed with key value 605. For each distinct input, the PRF 603 generates a one-time token value 607.

As is illustrated in FIGS. 6A and 6B, the use of the 32-bit LFSR 601A greatly reduces the complexity of the circuitry required to provide the distinct inputs to the keyed PRF 603. The 32-bit counter 601B requires relatively complex circuitry to perform addition and handle carry bits. Moreover, between every pair of bits (and carry bit) that are added, a delay element must be introduced to the circuitry to ensure that the carry bit has an opportunity to propagate and settle before the next pair of bits (and carry) are added together. The 32-bit LFSR 601A is configured with a characteristic polynomial that leads to a sufficiently long sequence of distinct values as described herein. If the characteristic polynomial of the 32-bit LFSR 601A is primitive, then the sequence will be maximal (e.g., there will be no repeated values within the first $2^n-1$ state values of an n-bit LFSR). The outputs of the 32-bit LFSR 601A will, in turn, be processed by the PRF 603. Because the values produced by the 32-bit LFSR 601A are distinct, the outputs produced by the PRF 603 will be unpredictable and hence serve as strong OTP values 607.

There are many choices for primitive polynomials. If a 32-bit LFSR is used as shown in FIG. 6A, then the primitive polynomial $x^{32}+x^{22}+x^2+x+1$ can serve as a characteristic polynomial that will lead to the LFSR 601A being able to produce $2^{32}-1$ distinct values, so long as the state of the LFSR starts with a non-zero value.

During regular operations, whenever a new OTP is needed, the LFSR operations can be executed once, and the results can be normalized and input into the PRF 603. The output of the PRF 603 can then be normalized and, if appropriate, truncated prior to being displayed for a user (or transmitted from an authentication token to a validating application).

In the description above, the LFSRs were assumed to be so-called Fibonacci LFSRs. Other variations of LFSRs may also be used, including Galois LFSRs which slightly adjust when data is read and when the shift operation occurs. Also, while various embodiments were described above with respect to using the output of one LFSR to provide the distinct input to the PRF, embodiments are not so limited. In some embodiments, the outputs of multiple LFSRs may be concatenated or otherwise combined to provide a single, larger distinct input to a PRF. For example, the outputs of two 16-bit LFSRs may be combined to form a 32-bit input to a PRF, the outputs of four 32-bit LFSRs may be combined to form a 128-bit input to a PRF, etc.

Also, the output of a LFSR may be padded to provide a larger distinct input to a PRF. For example, the PRF may take as input a distinct 128-bit value for producing OTPs. In such an instance, a 32-bit LFSR may be used to provide the distinct inputs, with the output of the 32-bit LFSR being padded with 0s or 1s to form a 128-bit input to the PRF. Various other examples are possible. The output of the LFSR may also be concatenated or combined with various other strings as part of generating the input to the PRF. Such other strings may be obtained from various sources, including based on user input.

It should be appreciated that the various parameters and keys described herein may be configured in a variety of ways, including settings that are based on user input. User inputted parameters themselves may take on a variety of formats and approaches. For example, a user inputted parameter may be directly input through an input mechanism such as a keyboard. Alternatively, such user inputted parameters may be derived from other attributes, such as a biometric marker like a fingerprint. For the latter case, mechanisms may be used to normalize the biometric marker so that the value derived from the marker is consistent. One example of such a mechanism is the use of fuzzy hash functions.

As noted above, authentication tokens may be time-synchronous or event-synchronous. In some embodiments, a time-synchronous authentication token involves a time-driven update of a counter (e.g., the counter is incremented every 30 seconds or some other designated interval). In other embodiments, an event-synchronous authentication token involves a user-driven counter update. In this case, the authentication token may include a button or other input mechanism that the user can activate to increment the counter. An analogous mechanism that can be used for LFSR-based authentication tokens is that when the user presses the button or otherwise activates the input mechanism to update the event "counter" the display will output the value of the PRF applied to the current state of LFSR, after which the LFSR is shifted. It should be noted that the reverse is also an option, where the LFSR is first shifted and then the PRF value is computed and displayed.

Also as noted above, in some embodiments authentication tokens are configured with a display or otherwise provide functionality for outputting a visual indication of the current OTP. The OTPs may also be communicated in other ways, such as being directly input to a validating application or authentication service when the authentication token is a connected token. In such cases, the OTP is not necessarily output or otherwise displayed to the user.

In some cases, the current value of the OTP produced by an authentication token becomes out of sync with the corresponding value produced by the validating application (e.g., at an authentication server) that is performing authentication. In such cases, the user can provide multiple OTPs. The validating application can similarly generate multiple values using the same parameters that the authentication token is believed to be using. Based on this information, the validating application can identify the point at which it produces the same value as the OTP produced by the authentication token. Providing multiple OTPs also has the benefit of increasing the confidence that the validating application has about the current state of the authentication token. The validating application is also able to adjust its settings to re-synchronize with the authentication token. It should be noted that due to issues such as clock skew and other considerations, it is generally not feasible in practice for the authentication token and the validating application to be perfectly synchronized. However, it is possible to synchronize the authentication token and the validating application close enough that the impact on user experience is minimized.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating authentication information using LFSRs will now be described in greater detail with reference to FIGS. 7 and 8. Although described in the context of system 100, these platforms may also be used to implement at least portions of other information processing systems in other embodiments.

Figure 7:
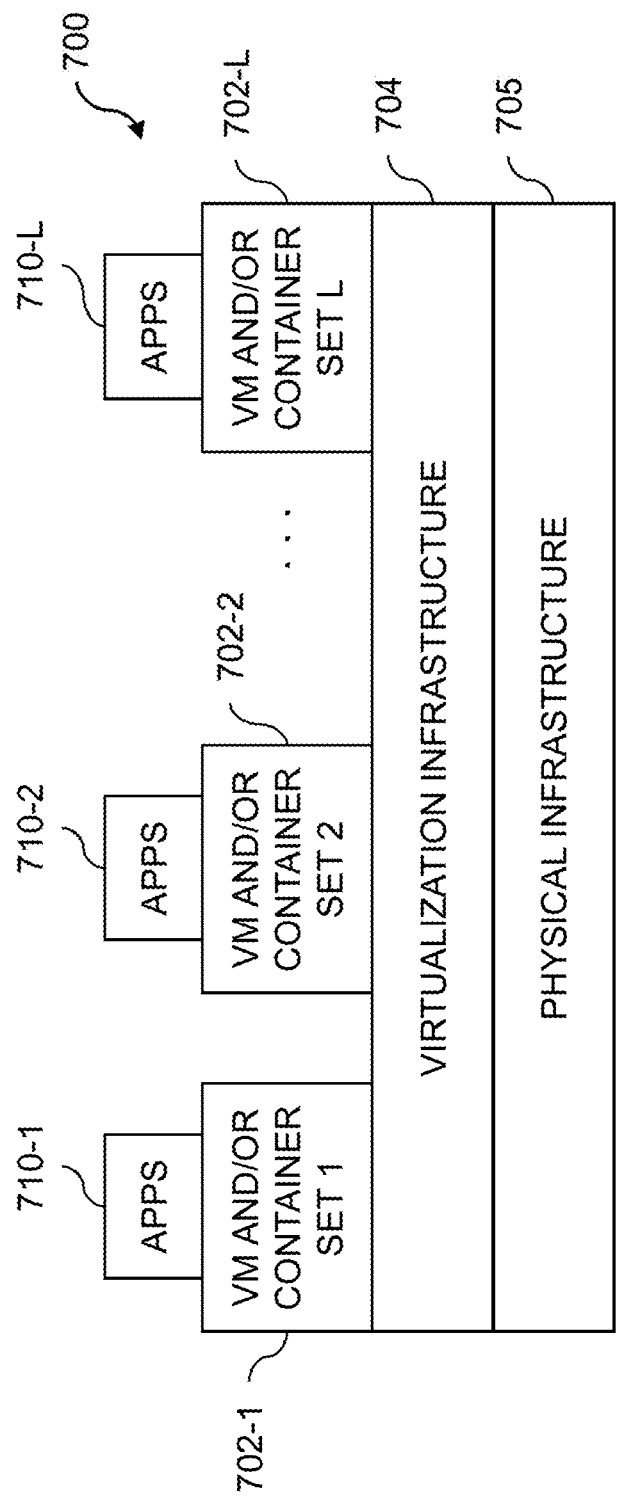
FIGS. 7 and 8 show examples of processing platforms that may be utilized to implement at least a portion of an information processing system in illustrative embodiments.
Figure 8:
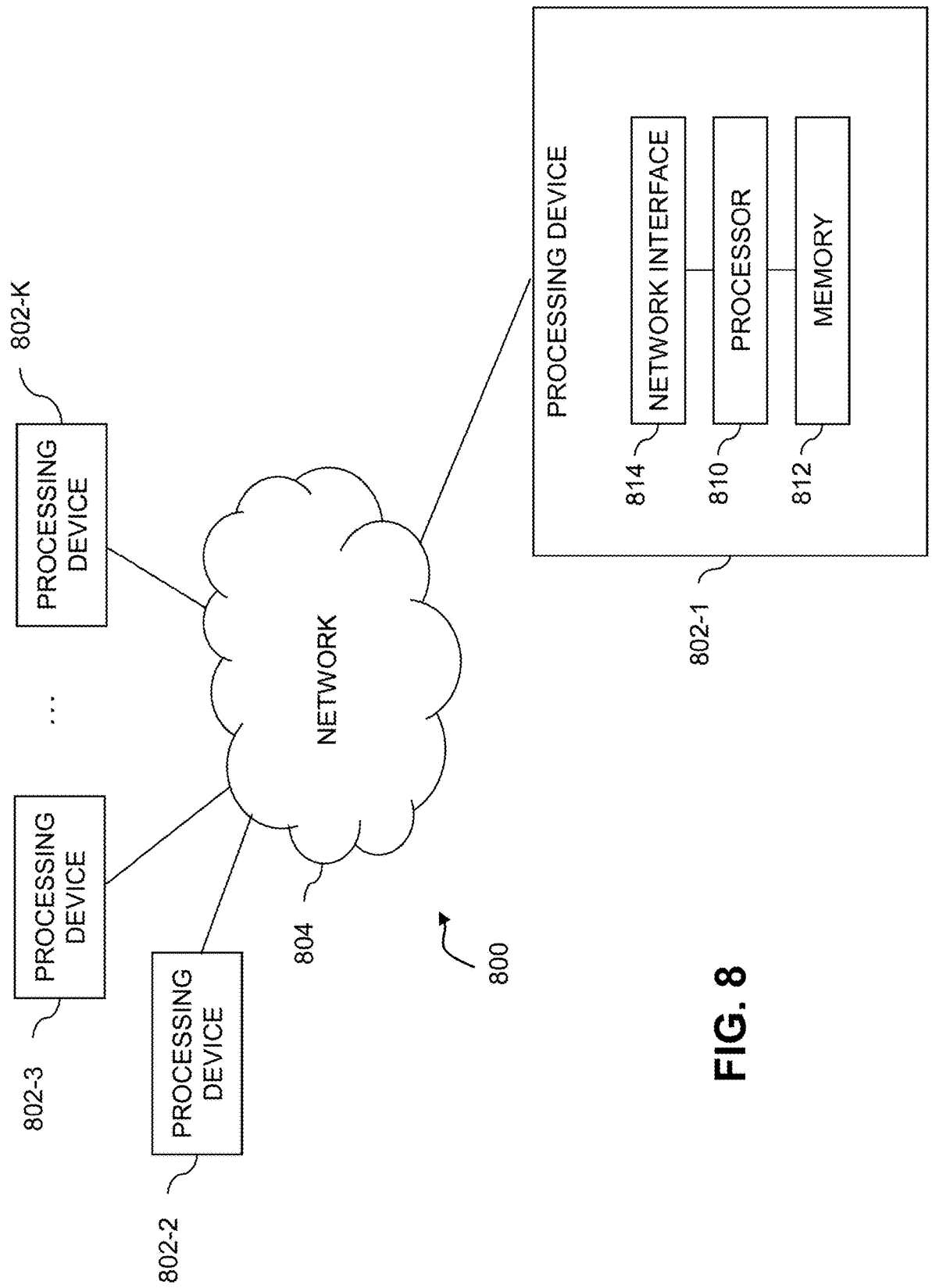

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. An example of a hypervisor platform that may be used to implement a hypervisor within the virtualization infrastructure 704 is the VMware® vSphere® which may have an associated virtual infrastructure management system such as the VMware® vCenter™.

The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating authentication information using LFSRs as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, types or configurations of LFSRs, PRFs, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising:
a processor coupled to a memory; and
at least one linear feedback shift register;
the at least one processing device being configured to perform two or more iterations of:
to obtain a given value from the at least one linear feedback shift register, the given value comprising a set of bits representing a current state of the linear feedback shift register;
to generate authentication information by applying the given value obtained from the at least one linear feedback shift register as input to a pseudorandom function, the pseudorandom function being distinct from the at least one linear feedback shift register, the pseudorandom function being keyed with a key value different than the given value obtained from the at least one linear feedback shift register; and
to provide the generated authentication information to a validating application;
wherein in each of at least first and second ones of the two or more iterations, the given value obtained from the at least one linear feedback shift register provides at least a portion of a distinct input to the pseudorandom function.

2. The apparatus of claim 1 wherein the at least one processing device is further configured to, in the first one of the two or more iterations, initialize the at least one linear feedback shift register with a starting state comprising at least one non-zero bit value.

3. The apparatus of claim 2 wherein the at least one linear feedback shift register comprises an n-bit linear feedback shift register configured to produce a sequence of $2^n-1$ distinct states when initialized with the starting state comprising at least one non-zero bit value.

4. The apparatus of claim 1 wherein the at least one processing device is configured to initiate a shift in the at least one linear feedback shift register responsive to expiration of a designated time window.

5. The apparatus of claim 1 wherein the at least one processing device is configured to initiate a shift in the at least one linear feedback shift register responsive to detecting one or more designated events.

6. The apparatus of claim 5 further comprising at least one input device, wherein detecting the one or more designated events comprises receiving user-driven input from the at least one input device.

7. The apparatus of claim 5 wherein detecting the one or more designated events comprises receiving indication that a given event has occurred from at least one additional processing device.

8. The apparatus of claim 1 wherein obtaining the given value comprises:
obtaining a first value comprising a first set of bits representing a current state of a first linear feedback shift register;
obtaining at least a second value comprising a second set of bits representing a current state of at least a second linear feedback shift register; and
combining the first value and the second value to generate the given value.

9. The apparatus of claim 8 wherein combining the first value and the second value to generate the current value comprises concatenating the first value and the second value.

10. The apparatus of claim 1 wherein obtaining the given value comprises:
obtaining a first value comprising a first set of bits representing a current state of the at least one linear feedback shift register;
obtaining a second value comprising a second set of bits from at least one additional source; and
combining the first value and the second value to generate the given value.

11. The apparatus of claim 10 further comprising at least one user input device, the at least one additional source comprising user input to the at least one user input device.

12. The apparatus of claim 10 wherein the at least one user input device comprises at least one of:
a keyboard; and
a biometric reader.

13. The apparatus of claim 1 wherein providing the generated authentication information to the validating application in a given one of the two or more iterations comprises:
providing first authentication information generated by applying the given value obtained from the at least one linear feedback shift register in the given iteration as input to the pseudorandom function; and
providing second authentication information generated by applying one or more previous values obtained from the linear feedback shift register in one or more previous ones of the two or more iterations as input to the pseudorandom function, the one or more previous values comprising respective sets of bits representing one or more previous states of the at least one linear feedback shift register.

14. The apparatus of claim 1 wherein the generated authentication information comprises a one-time password.

15. The apparatus of claim 1 wherein the at least one processing device is configured to implement a hardware authentication token, and wherein the validating application comprises at least one of: an application running on the at least one processing device; and an application running on at least one additional processing device.

16. The apparatus of claim 1 wherein the at least one processing device is configured to implement a software authentication token, and wherein the validating application comprises at least one of: another application running on the at least one processing device; and an application running on at least one additional processing device.

17. A method comprising performing two or more iterations of:
obtaining a given value from at least one linear feedback shift register, the given value comprising a set of bits representing a current state of the linear feedback shift register;
generating authentication information by applying the given value obtained from the at least one linear feedback shift register as input to a pseudorandom function, the pseudorandom function being distinct from the at least one linear feedback shift register, the pseudorandom function being keyed with a key value different than the given value obtained from the at least one linear feedback shift register; and
providing the generated authentication information to a validating application;
wherein in each of at least first and second ones of the two or more iterations, the given value obtained from the at least one linear feedback shift register provides at least a portion of a distinct input to the pseudorandom function; and
wherein the method is performed by at least one processing device comprising a processor coupled to a memory.

18. The method of claim 17 further comprising, in the first one of the two or more iterations, initializing the at least one linear feedback shift register with a starting state comprising at least one non-zero bit value, the at least one linear feedback shift register comprises an n-bit linear feedback shift register configured to produce a sequence of $2^n-1$ distinct values when initialized with the starting state comprising at least one non-zero bit value.

19. A computer program product comprising a non-transitory processor-readable storage medium having stored therein program code of one or more software programs, wherein the program code when executed by at least one processing device causes the at least one processing device to perform two or more iterations of:
obtaining a given value from at least one linear feedback shift register, the given value comprising a set of bits representing a current state of the linear feedback shift register;
generating authentication information by applying the given value obtained from the at least one linear feedback shift register as input to a pseudorandom function, the pseudorandom function being distinct from the at least one linear feedback shift register, the pseudorandom function being keyed with a key value different than the given value obtained from the at least one linear feedback shift register; and providing the generated authentication information to a validating application;

wherein in each of at least first and second ones of the two or more iterations, the given value obtained from the at least one linear feedback shift register provides at least a portion of a distinct input to the pseudorandom function.

20. The computer program product of claim 19 wherein the program code when executed by the at least one processing device further causes the at least one processing device, in the first one of the two or more iterations, to initialize the at least one linear feedback shift register with a starting state comprising at least one non-zero bit value, the at least one linear feedback shift register comprises an n-bit linear feedback shift register configured to produce a sequence of $2^n-1$ distinct values when initialized with the starting state comprising at least one non-zero bit value.

* * * * *